June 18, 1968
F. V. ELLIS
3,388,715
LUBRICATED VALVE WITH SPRING MEANS FOR RELIEVING
EXCESSIVE SEALANT PRESSURE
Filed June 9, 1967
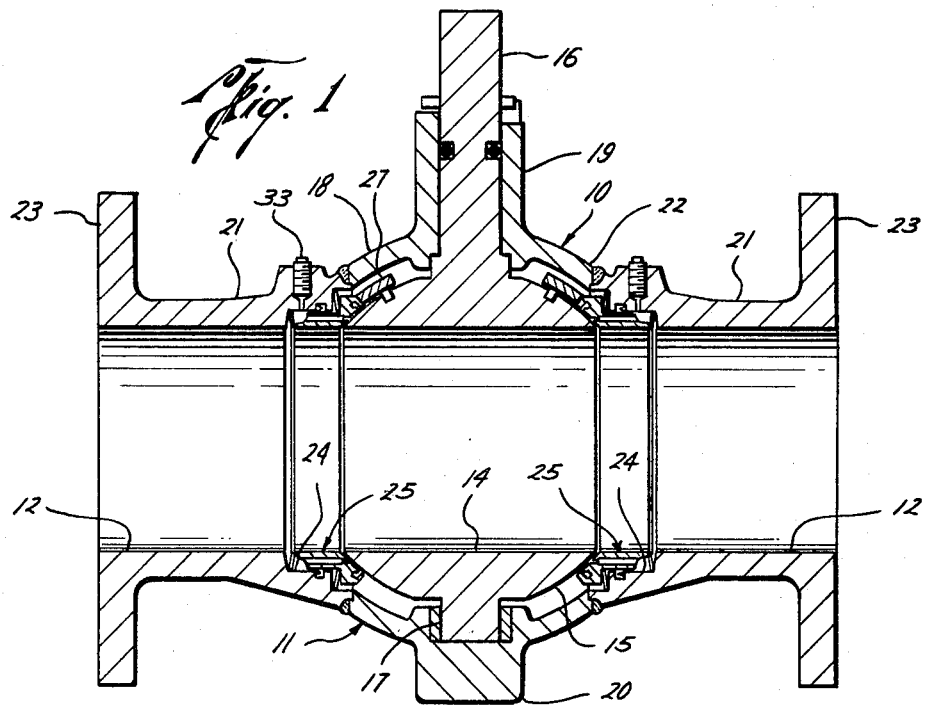
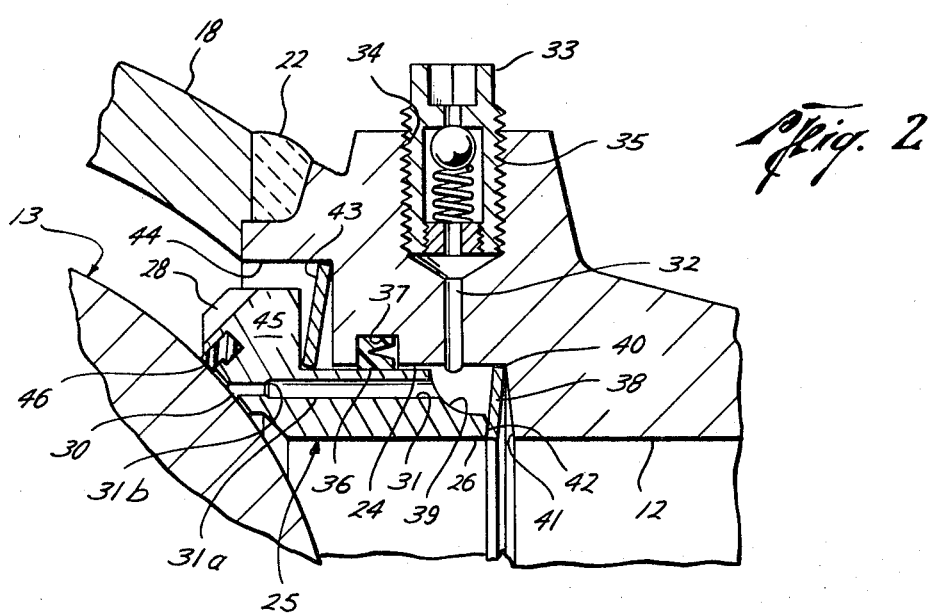
Frank V. Ellis
INVENTOR
BY Browning, Seime, Ayer & Eickenroht
ATTORNEY

United States Patent Office 3,388,715
Patented June 18, 1968

3,388,715
LUBRICATED VALVE WITH SPRING MEANS FOR RELIEVING EXCESSIVE SEALANT PRESSURE
Frank V. Ellis, Houston, Tex., assignor to Cameron Iron Works, Inc., Houston, Tex.
Filed June 9, 1967, Ser. No. 644,909
4 Claims. (Cl. 137—246.22)

ABSTRACT OF THE DISCLOSURE

A valve comprising a valve body having a flowway through it and a closure member mounted within the valve body for movement between flowway opening and closing positions. A valve seat mounted within the flowway on each side of the closure member includes an annular body having a groove about its inner end opposite its respective side of the closure member, and a seal ring surrounds the outer circumference of the seat body to seal between it and the flowway. A washer-type spring engages at its opposite ends with the flowway and the outer end of the seat body near its inner circumference to enclose a chamber about the seat body intermediate the spring and seal ring and to urge the inner end of the seat body against the closure member. A passageway in the valve body connects its exterior with the chamber to permit introduction of lubricant into the chamber, and passageways in the seat body connect the chamber with the groove to conduct lubricant in the chamber to the groove. The end of the spring which engages the seat is disengageable from it to relieve lubricant within the chamber when the pressure of the lubricant reaches a predetermined level.

---

This invention relates generally to valves of the type in which lubricant is delivered to the inner ends of the seats for sealing between them and the closure member. More particularly, it relates to improvements in valves of this type in which the lubricant is also caused to drive the seat against the closure member, and then be relieved when its pressure becomes excessive.

In many cases, the surfaces on the inner ends of the seats and the closure member of a valve are worn or scored so that it is difficult to seal between them. Therefore, the seats are often "lubricated" by means of a viscous grease contained within a groove about the inner end of the seat to provide a film over the surface of the closure member adjacent the groove. For this purpose, a conventional "grease gun" is attached to a fitting on the exterior of the valve body which connects with passageways in the valve body and seat for conducting the lubricant to the groove at a desired pressure.

In order to insure a seal between the inner end of the seat and the closure member, it has been proposed to subject an area of the seat which faces outwardly or away from the closure member to the lubricant pressure in order to urge the seat inwardly toward seating position. More particularly, this area has been made larger than the oppositely facing area circumscribed by the inner and outer diameters of the groove on the inner end of the seat so as to provide a resultant force toward the closure member.

Although such an arrangement may insure a seal and thus prevent leakage past the inner end of the seat, it creates other problems when there is no control over the degree to which the lubricant is pressurized. Thus, when the lubricant pressure so applied is excessive, the seat may be forced against the closure member so tightly as to make it difficult to turn, and, in some cases, to actually injure the sealing surface of the closure member. Furthermore, when the lubricant is introduced into an annular chamber between the flowway through the valve body and the outer circumference of the seat, its pressure may become so high as to distort or even collapse the seat radially inwardly. It has therefore been proposed to further provide some means for relieving the lubricant when its pressure becomes excessive.

In prior lubricated valves provided for accomplishing these dual purposes, such as that shown in Pat. No. 3,313,697, the annular chamber into which the lubricant is introduced is confined at its opposite ends by seal rings sealing between the outer circumference of the seat body and valve body flowway on opposite sides of the intersection of the lubricant passageway in the valve body with the flowway. Obviously, close tolerances are required between the seat body and flowway in order to maintain sealing engagement of these axially spaced apart seal rings. This may be especially difficult in the case of ball valves wherein the closure member has a tendency to wobble.

Also, in the valves of the type in which the seat is rotated about its axis, as shown in Pat. No. 3,157,190, these two seal rings cause substantial friction between the seat and flowway and thus increase the torque required to rotate the seat. Furthermore, in the valve shown in Pat. No. 3,313,697, one seal ring is normally held in sealing engagement between the flowway and the seat body by a spring engaging the seal ring near the outer circumference of the seat body. Thus, there is a large moment arm over which the friction between the spring and seal ring acts in resisting the torque required to rotate the seat.

If the lubricant enters the groove on the inner end of the seat of such a valve too soon, it may cause the seat to back off prematurely from the closure member. Thus, for this purpose, the lubricant flow through the passageways through the seat body should be restricted. On the other hand, it is desirable to make the passageways large to limit the frictional resistance to passage of the viscous lubricant. Also, of course, it is easier to drill larger passageways all the way through the seat body in the fabrication thereof.

In the seats of these prior lubricated type valves, it has been impossible to satisfy both of these requirements. Thus, due to the two seal rings, it has been impractical to drill the passageways in the seat bodies except from their inner ends, and, in order to prevent premature relief of the lubricant, it has been necessary to drill the passageways rather small. Still further, the two seal rings have made it impractical in any case to drill the passageway all the way through the seat body.

An object of this invention is to provide a valve of the type above-described having a seat construction which permits greater flexibility between the closure member and valve body and which offers less resistance to seat rotation than prior valves of this type.

Another object is to provide such a valve in which only one seal ring is required between the outer circumference of the seat body and the flowway, and further in which a spring urging the seat body against the closure member offers considerably less resistance to rotation of the seat body than those of such prior valves.

A further object is to provide such a valve in which the lubricant passageways through the seat are relatively large throughout substantially their entire lengths, but nevertheless serve to prevent premature relief of the lubricant.

Still another object is to provide such a valve in which the single seat ring between the seat body and flowway is protected against debris both from within and without the seat, thereby reducing the likelihood of the seat becoming stuck.

These and other objects are accomplished, in accordance with the present invention, by a valve in which the annular lubricant chamber about each seat body is enclosed by a seal ring surrounding the outer circumference of the seat body and a washer-type spring engaging at one end with the flowway and at the other end with the outer end of the seat body to urge the inner end of such seat body against the side of the closure member. Thus, as in prior valves of this type, lubricant may be introduced into the chamber through a passageway in the valve body and then conducted through passageways in the seat body from the chamber to a groove about the inner end of the seat body opposite the one side of the closure member. More particularly, the washer-type spring engages the seat body near its inner circumference and is disengageable from it to relieve lubricant within the passageway when the pressure of the lubricant reaches a predetermined level.

In the preferred embodiment of the invention, the lubricant passageways in the seat body extend axially from the groove to intersect the outer end of the seat body intermediate the inner and outer circumferences thereof. More particularly, each of the passageways of the seat body is relatively large through most of its length and then restricted toward its inner end adjacent the groove. It is also preferred that a washer-type spring engage between the valve body and seat body on the side of the seal ring away from the lubricant chamber, so as to protect the seal ring on such side from the intrusion of debris of various types which might otherwise cause the valve seat to stick.

In the drawings, wherein like reference characters are used throughout to designate like parts:

FIG. 1 is a longitudinal sectional view of a valve having lubricated seats constructed in accordance with the present invention, and with the closure member thereof in flowway opening position; and FIG. 2 is an enlarged sectional view of part of one of the seats and part of the valve body of the valve of FIG. 1, but with the closure member moved to flowway closing position.

With reference now to the details of the above-described drawings, the valve shown in FIG. 1, and designated in its entirety by reference character 10, includes a valve body 11 having a flowway 12 therethrough and a closure member 13 movable within the body for opening and closing the flowway. More particularly, the closure member 13 includes an opening 14 through a ball 15 and upper and lower stems 16 and 17, respectively, on such ball to permit it to be rotated between positions in which the opening 14 is aligned with the flowway 12 to open same (FIG. 1) and in which a solid portion of the ball is disposed across the flowway to close same (FIG. 2).

The valve body 11 includes a central portion 18 having bearings 19 and 20 on the upper and lower sides thereof, respectively, for receiving the ball stems 16 and 17. As shown in FIG. 1, the stem 16 extends through the bearing 19 to provide an external part for actuating the closure member. The inner surface of this central body portion is shaped spherically and concentrically of the outer surface of ball 15 to provide a cavity fitting closely thereabout.

The valve body 11 also includes tubular extensions 21 connected by welding 22 to the opening in each opposite end of central body portion 18. These tubular extensions have flanges 23 on their outer ends for connecting the valve in a pipeline and annular recesses 24 on their inner ends adjacent the closure member 13 to form enlarged diameter portions of the flowway 12 for receiving seats 25 adapted to seal against opposite sides of the closure member in the closed position thereof. As shown in FIG. 1, the openings 26 through the seats are the same diameter as the ball opening 14, and the openings 14 and 26 are in turn of the same diameter as the reduced diameter portions at opposite ends of the flowway 12 through the tubular extensions 21 of the valve body, so that the valve is "full opening" in the position of FIG. 1.

As described more fully in U.S. Pat. No. 3,157,190, the central portion 18 of the valve body 11 may be split along a plane passing through the axis of the flowway and perpendicular to the axis of rotation of the closure member, and the split parts then assembled over the stems 16 and 17 and welded to one another to capture the closing member. At this time, the seats 25 may be assembled within the recesses 24 of each tubular extension 21, and the extensions and the seats moved into positions for mounting the seats and forming the welds 22 connecting the tubular extensions 21 to the openings in opposite sides of central portion 18 of the valve body. This, of course, also captures the seats against removal from the valve body except upon destruction of the welds 22.

In its preferred form, the valve 10 also includes a means for rotating each seat 25 about its axis in response to operation of the valve so as to distribute wear about the seat. Thus, as shown in FIG. 1, a dog 27 is carried on each upper side of the ball 15 for engaging with and disengaging from teeth 28 about the periphery of the seat 25 as the closure member is rotated between opened and closed positions. A detailed explanation of the construction and operation of these parts can be found in the aforementioned Pat. No. 3,157,190.

As best show in FIG. 2, each seat 25 comprises an annular one-piece body 29 having a groove 30 in its inner end for disposal opposite the closure member 13. As previously mentioned, this groove is adapted to contain a viscous grease to provide a sealing film across the oppositely disposed surface of the closure member. For this purpose, the body 29 of the seat has passageways 31 therein for connecting the groove with a passageway 32 in the valve body to which a fitting 33 is connected to permit lubricant to be injected through the passageways and into the groove at a desired pressure. Thus, the outer end of the valve body passageway 32 has threads 34 thereabout to receive threads 35 of the fitting, which may be of conventional construction.

A seal ring 36 surrounds the outer circumference of the seat body 29 and is contained within an angular groove 37 in the flowway recess 24 so as to seal between the flowway and the seat body on the inner side of lubricant passageway 32. A washer-type spring 38 engages between the flowway on the outer side of the lubricant passageway 32 and the outer end of the seat body 29 near its inner circumference. Thus, as previously described, this spring not only urges the inner end of the seat body against the closure member 13, but also cooperates with the seal ring 36 to enclose an annular lubricant chamber between the seat body and flowway with which each of the inner end of passageway 32 and outer ends of passageways 31 is connected.

Preferably, the radially outer portion of the outer end of the seat body 29 is recessed at 39 from a point about its outer circumference near the inner side of lubricant passageway 32 and a point radially inward of the inner side of lubricant passageways 31. In this manner, the viscous lubricant has easy access from passageway 32 into passageways 31.

As previously described, when the pressure of the lubricant within the lubricant chamber becomes excessive, the inner end of the spring 38 engageable with the outer end of the seat body 29 disengages therefrom to permit lubricant to pass out of the chamber between the seat body and the spring. Then, of course, after relief of the lubricant, the inner end of the spring moves back into engagement with the seat body so as to again enclose the lubricant chamber. At the same time, of course, the lubricated seat provides the other desired functions of lubricating the surface between the inner end of the seat and the closure member and driving the seat against the closure member.

As shown in FIG. 2, the washer-type spring 38 is a

Belleville spring whose outer end engages a radial land 40 on the wall 41 connecting the reduced diameter portion of the flowway 12 with the recess 24 thereof. The inner end of the spring 38 also engages a land 42 on the extreme outer end of the seat body 29, which similarly to land 40 extends in a direction perpendicularly with respect to the axis of the seat.

As previously described, each of the lubricant passageways 31 in the seat body has a relatively large portion 31a extending from the outer end of the seat body to a point near the intersection of its inner end with the groove 30. More particularly, this relatively large portion 31a of the passageway has a restriction 31b leading to the groove 30, so as to thereby normally confine the lubricant as it passes through the portions 31a of the various passageways 31. In this manner, substantially all of the portions 31a are filled with lubricant before much of it has access to the groove 30, thereby normally preventing premature relief of the lubricant, which might otherwise occur due to backing of the seat away from the closure member 13. As will be understood from the foregoing, the portions 31a of each of the passageways 31 may be drilled from the outer end of the seat body.

In the preferred form of the invention, there is also a washer-type spring 43 engaging between the flowway 12 adjacent a further enlarged portion 44 thereof and an enlarged head 45 on the radially outward portion of the inner end of the seat. This spring forces the seat body inwardly against the closure member with sufficient force to maintain contact at its inner end with the seat body and at its outer end with the valve body. In this way, the spring 43 serves to prevent debris from having access into the space between the flowway and seat body.

There is also a seal ring 46 received within a groove about the seat body radially outwardly from groove 30. As shown in FIG. 2, the inner end of the ring 46 engages the outer surface of the closure member 13 when the seat is urged against the closure member to prevent lubricant from passing into the valve body downstream from the seat.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a valve body having a flowway therethrough, a closure member mounted within the body for movement between positions opening and closing the flowway, a valve seat mounted within the flowway on one side of the closure member and including an annular body having a groove about its inner end opposite the closure member, a seal ring surrounding the outer circumference of the seat body to seal between it and the flowway, a washer type spring engaging at its opposite ends with the flowway and the outer end of the seat body near its inner circumference so as to enclose a chamber about said seat body intermediate the spring and seal ring and urge the inner end of said seat body against the closure member, a passageway in the valve body connecting the exterior thereof with the chamber to permit lubricant to be introduced into the chamber, and passageways in the seat body connecting the chamber with the groove to conduct lubricant in the chamber to said groove, the end of the spring which engages with the seat body being disengageable therefrom to relieve lubricant within the chamber when the pressure of said lubricant reaches a predetermined level.

2. A valve of the character defined in claim 1, wherein the passageways in the seat body extend axially from the groove for intersection with the outer end of the seat body intermediate the inner and outer circumferences thereof.

3. A valve of the character defined in claim 1, wherein each of the seat body passageways is restricted toward its end adjacent the groove.

4. A valve of the character defined in claim 1, including another washer type spring engaging between the valve body and the seat body on the side of the seal ring away from the chamber.

References Cited
UNITED STATES PATENTS

| | | | |
|---|---|---|---|
| 2,030,458 | 2/1936 | McKellar | 137—246.22 |
| 2,837,308 | 6/1958 | Shand | 251—174 |
| 3,123,078 | 3/1964 | Brooks | 137—246.22 |
| 3,135,285 | 6/1964 | Volpin | 137—246.12 |
| 3,181,552 | 5/1965 | Jackson | 137—246.12 |
| 3,241,808 | 3/1966 | Allen | 137—330 X |
| 3,315,697 | 4/1967 | Oliver | 137—246.22 |

CLARENCE R. GORDON, *Primary Examiner.*